(12) United States Patent
Zhang

(10) Patent No.: US 6,836,675 B2
(45) Date of Patent: Dec. 28, 2004

(54) METHOD FOR AIMING AND ADJUSTING MICROWAVE ANTENNA DURING INSTALLATION, AND APPARATUS

(76) Inventor: Franklin Zhigang Zhang, 4808 Laurette St., Torrance, CA (US) 90503

( * ) Notice: Subject to any disclaimer, the term of this patent is extended or adjusted under 35 U.S.C. 154(b) by 568 days.

(21) Appl. No.: 10/039,715

(22) Filed: Jan. 3, 2002

(65) Prior Publication Data

US 2002/0090941 A1 Jul. 11, 2002

Related U.S. Application Data

(60) Provisional application No. 60/260,297, filed on Jan. 8, 2001.

(51) Int. Cl.[7] .............................................. H04M 1/00
(52) U.S. Cl. ................. 455/562.1; 455/561; 455/67.11; 455/67.15; 343/878; 343/894; 342/357.01; 342/357.08
(58) Field of Search .............................. 455/562.1, 561, 455/25, 73, 63.4, 67.11, 67.15; 343/878, 882, 894; 342/357.01, 357.02, 357.08

(56) References Cited

U.S. PATENT DOCUMENTS

| | | | |
|---|---|---|---|
| 6,415,163 B1 * | 7/2002 | Keskitalo et al. ........ | 455/562.1 |
| 6,735,452 B1 * | 5/2004 | Foster et al. ............. | 455/562.1 |
| 6,748,240 B1 * | 6/2004 | Foster et al. ............. | 455/562.1 |
| 2004/0048635 A1 * | 3/2004 | Goldberg ................. | 455/562.1 |
| 2004/0067775 A1 * | 4/2004 | Dalal et al. .............. | 455/562.1 |
| 2004/0132414 A1 * | 7/2004 | Sendyk et al. ............... | 455/73 |

* cited by examiner

*Primary Examiner*—William Trost
*Assistant Examiner*—Danh Le

(57) ABSTRACT

The present invention disclosures a method for aiming antennas during the installation of microwave communication systems. By computerized link quality monitoring mechanism, the software of the computer system can monitor the link quality of the link during the aiming of the installation. The link quality comprises the performance of data communication status, and the signal strength and noise tests result. By aiming and installing the antenna at the best link quality direction, the microwave communication system will work at best performance status. The software system also will guide the installer to follow certain procedures and finally affix and aim the antenna to the best direction. There are no extra equipments, such as high cost spectrum analyzer needed. And also, no super high-skilled microwave experts are needed to install and setup the microwave communication system.

9 Claims, 9 Drawing Sheets

METHOD FOR AIMING AND ADJUSTING MICROWAVE ANTENNA DURING INSTALLATION, AND APPARATUS

CROSS-REFERENCE TO RELATED APPLICATIONS

This application claims the benefit of the Provisional Patent Application Ser. No. 60/260,297 filed Jan. 1, 2001.

BACKGROUND

1. Field of Invention

This invention is concerned with a method for aiming a directional microwave antenna during the installation, specifically to a computer guided microwave antenna aiming method to get the best link performance for digital microwave communication system.

2. Description of Prior Art

Microwave antennas are usually essential parts of microwave telecommunication systems. These microwave antennas are most likely placed on the top of high structures such as antenna towers or high buildings. Each antenna is placed in a certain distance from another antenna. Installing microwave antennas requires lining up two antennas in a certain way that the microwave transmission and receive will be in the best situation.

The quality of microwave signal transmission depends on many environmental characters. The earth surface terrain can help or disturb the transmission of microwave signal. Any visible object or non-visible interference in the electromagnetic wave path may cause problem to the communication between both ends of the antennas as well as the radio systems behind the antennas.

In the prior art of installing the antenna as well as the radio communication systems, well-trained professional people are needed to get involved. All kinds of method are adopted to install the key devices—antennas. These methods include eyeball, which is most often used and most inaccuracy; multi-meter corresponding to the analog output of the radio, which is often used as a convenient and better accuracy than eyeball; expansive and sophisticate spectrum analyzer system and other professional equipments, which provide much better accuracy but very inconvenient. Most radio systems provide a reference indicator by software or by electronic of signal strength they receive. It helps a lot by indicating the signal strength during the installation. But, when the installer is high up at the roof of a tall building or at the high place of a high tower, it is very hard to carry any additional equipment to measure the signal strength so as to aim the antenna.

Nonetheless, well skilled professional is very hard to find. All above often cause the antennas are not aimed to right direction to provide the best performance for many radio communication system.

The microwave radio communication system is getting more and more popular nowadays, in another word; the modern space is crowded with many different electromagnetic waves. Obviously, it is very easy for a microwave communication system being interfered by other unknown resource. This means, even though a microwave communication system has enough signal strength detected, unknown interference can still cause problem to the communication of the system. Thus, the prior art of setting up the system by aiming the antenna at the direction, at which the system or the test equipments detect the strongest signal strength is not a secure method to guarantee the best signal to noise ratio for the system.

SUMMARY

One object of the present invention is to overcome the disadvantages of the prior-art methods described above and to achieve a novel type of apparatus and a method for aiming the antenna of the microwave communication system at the best direction during the installation.

The present invention is based on implementing the computerized link quality monitoring means, and the software system also guides the installer to follow certain procedures and finally affix and aim the antenna to the best direction, at which the communication between the two ends of the antennas is at the optimal situation.

More specifically, the apparatus in accordance with the present invention is characterized by adopting the link quality as the measurement for the aiming quality. The link quality comprises physical layer tests result of signal strength and noise, and data communication tests result of the communication of the systems. Thus the link quality is a much more accuracy measurement than the measurement of only the signal strength of the prior-art.

Furthermore, the method in accordance with the present invention is characterized by the computerized link quality monitoring mechanism, the software of the computer system can monitor the link quality of the link during the aiming of the installation, and the software system also guides the installers to follow certain procedures and finally the installers affix and aim the antenna to the best direction. In comparison to the prior-art, there are no costly and in-convenient equipments needed during installation. By the guidance of the computer software, a non-professional installer can install the system in a short time at best status.

In particular, when the radio systems of both ends are ready to communicate with each other, the first radio and antenna system is set in working condition, the software system of the present invention will guide the installer to turn the second microwave antenna in a substantially circular horizontal direction and using a computerized monitoring system to monitor and record link quality and corresponding horizontal positions of the horizontal link quality continuously while the second antenna is turning until the second microwave antenna makes a complete circle; affixing the second microwave antenna horizontally in a best horizontal position wherein such best horizontal position has a best link quality under the horizontal aiming situation; to turn the second microwave antenna in two substantially vertical opposing directions and using the computerized monitoring system to monitor and record link quality and corresponding vertical positions of the link quality continuously while the second antenna is turning vertically; and affixing the second microwave antenna vertically in a best vertical position wherein such best vertical position has a best link quality under the vertical aiming situation. Accordingly, the second microwave antenna is placed in a best link quality position in relationship to the first microwave antenna. The best aiming direction achieves.

OBJECTS AND ADVANTAGES

Accordingly, several objects and advantages of my invention are:

1) To provide high quality antenna aiming capability for microwave communication systems.
2) To provide high quality and low cost antenna-aiming capability for microwave communication systems.
3) To provide high efficiency and low cost antenna-aiming capability for microwave communication systems.
4) To provide better feature and easy use antenna-aiming capability for microwave communication systems.

5) To provide better communication system robustness by aiming the antenna at the optimized direction.

The forgoing features and advantages of the present invention can be appreciated more fully from the following description, with references to the accompanying drawings in which.

DESCRIPTION—PREFERRED EMBODIMENT

It is a common knowledge in the microwave communication industry that the microwave communication requires the antennas to send as well as receive signals from other antennas. The method according to the present invention not only assists in installing the second antenna, but can also be used in adjusting the pre-installed first antenna, if necessary, to be able to be placed in a best link quality position in relationship to the second antenna.

In the present invention, the distance between the first microwave antenna and the second microwave antenna is limited to capabilities of receive sensitivity of the radio systems that the microwave antennas are connected to. The present invention can be used in any wireless telecommunications where the signals are transmitted from one source and are received at another place where the receiving antenna needs to be adjusted for a best link quality. Examples of these wireless telecommunications are LMDS wireless local loop, MMDS system, Fixed Wireless LAN application, and etc; and, their point to point and point to multi-points deployment.

Figure 1:
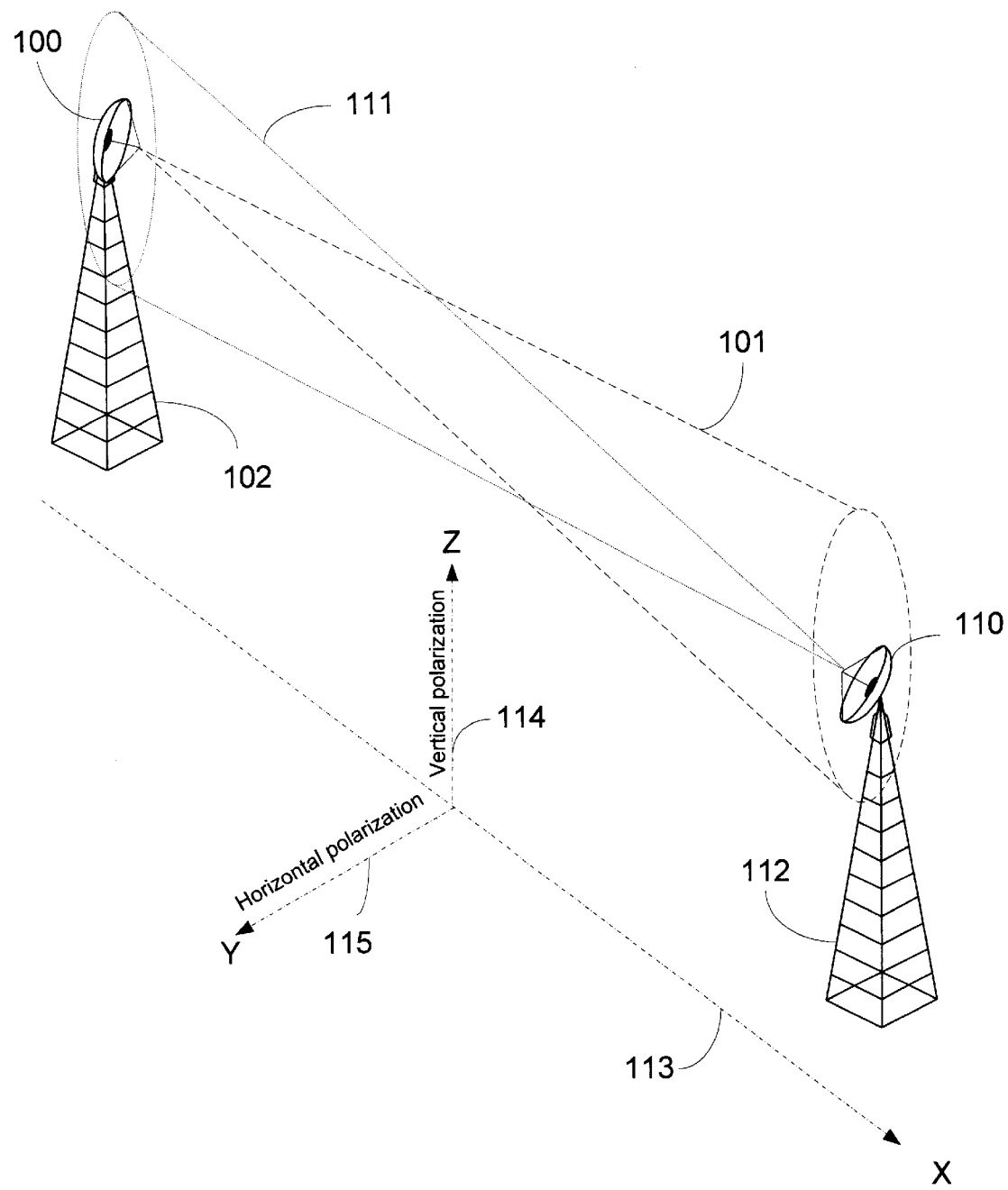
FIG. 1 is schematic diagram of a typical point-to-point microwave antennas communicating with each other, the vertical and horizontal antenna polarization.

FIG. 1 illustrates two microwave antennas installed in the position that each antenna is located in another antenna's lobe. Antenna 100 and antenna 110 are facing each other. Antenna 100 emits microwave signals toward antenna 110. The emitted signal from antenna 100 has the lobe 101 where antenna 110 is located in. Antenna 110 emits microwave signals toward antenna 100. The microwave signal from antenna 110 has the lobe 111 over antenna 100 (antenna 100 is in the microwave signal from antenna 110 which has the lobe 111). The size of either lobe 101 or lobe 111 depends on antenna characteristic and radio frequency. FIG. 1 is also a typical fixed wireless link, which includes two sets of radio systems, one of each antenna. As is illustrated in FIG. 1, either antenna 100 or antenna 110 moves from one direction, such as x 113, y 115 or z 114, while changing that antenna's emission lobe coverage, which in turn will change the wireless communication quality. Therefore, finding an optimum position for antenna 110 to communicate with antenna 100 is essential for the best communication link between antenna 100 and antenna 110.

Figure 1A:
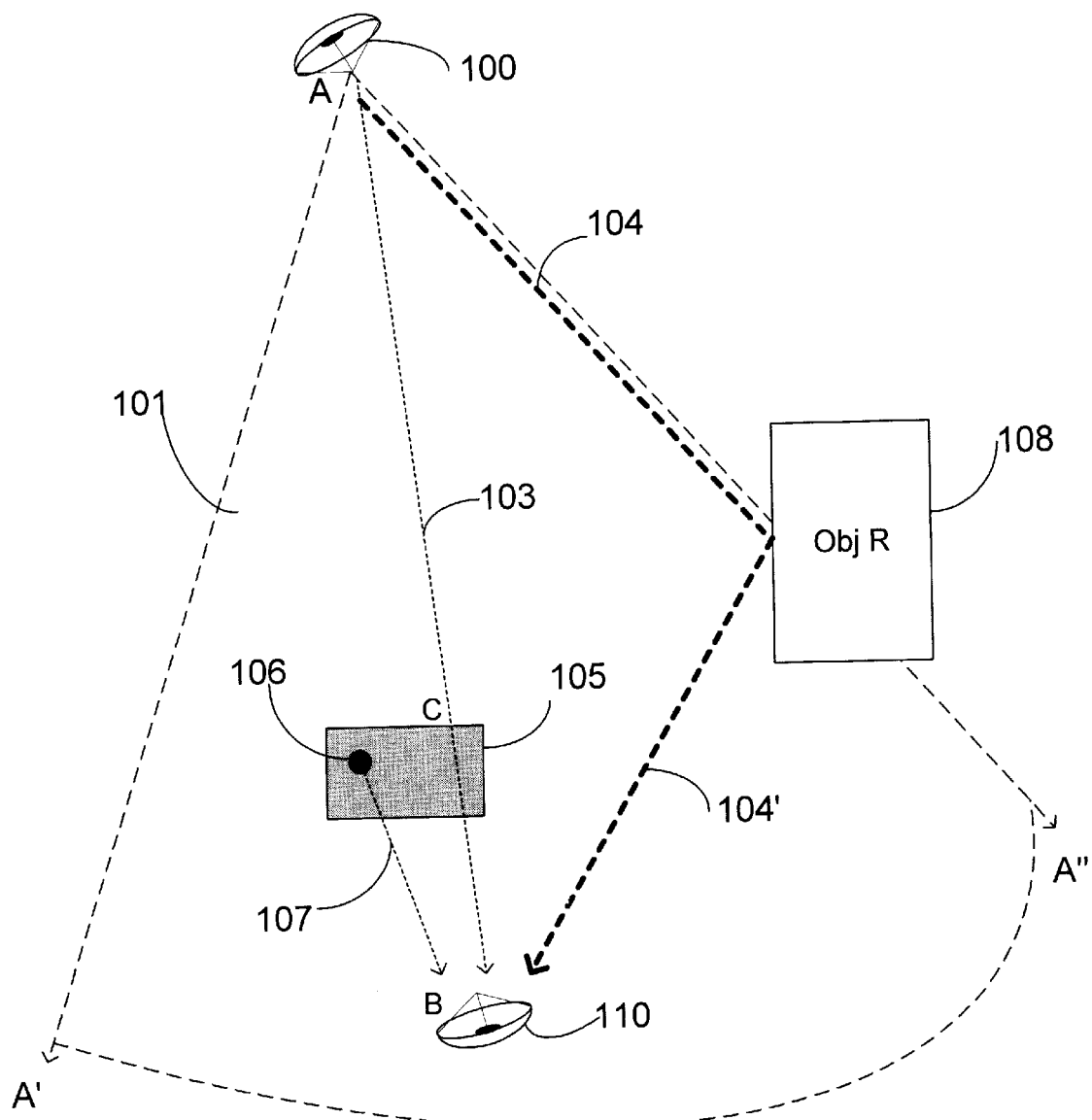
FIG. 1A is the schematic diagram illustrating the best aiming direction of two antennas in non-ideal deployment situations.

Any obstacles between antenna 100 and antenna 110 or any obstacles near the path of microwave signals between antenna 100 and antenna 110 will affect the quality of microwave communication. This is illustrated in FIG. 1A. In FIG. 1A, antenna 100 emits microwave radio signals. Antenna 110 receives microwave radio signals from antenna 100. Area 101 enclosed by A, A' and A" represents the antenna 100 coverage area. The antenna 110 is within area 101. The object 105 is in the direct position blocks the microwave radio signal from antenna 100 to antenna 110. The line AB 103 represents the microwave signal direct travel direction from antenna 100 to antenna 110. However, once this direct microwave radio signal AB 103 hits the building 105 at the point C, part of the microwave energy will be cut off, (Fresnel Zone reduced). This situation is one example of that even though there is line of sight between the antenna 100 and antenna 110, there is still not enough microwave energy reaches the antenna 110. Also as shown, there is an invisible microwave source 106 in the building 105, which is emitting the microwave energy at same frequency at the direction 107 to the antenna 110. In this situation, even though, there is enough microwave energy reaches antenna 110, microwave interference 107 comes from the building 105 at the same direction will cause bad signal to noise ratio. As shown in this embodiment, there is an object 108 with a good microwave reflection surface can reflect the microwave between two antennas. The microwave signal 104 from antenna 100 hits the object 108 and is reflected 104' to the antenna 110. If antenna 110 is aiming towards object 108, the microwave energy will reach antenna 100 through 104' and 104 directions, and also there is little microwave interference from 107 picked up by antenna 110. Obviously, the link quality between antenna 100 and antenna 110 via 104, 104' is better than via 103.

Figure 1B:
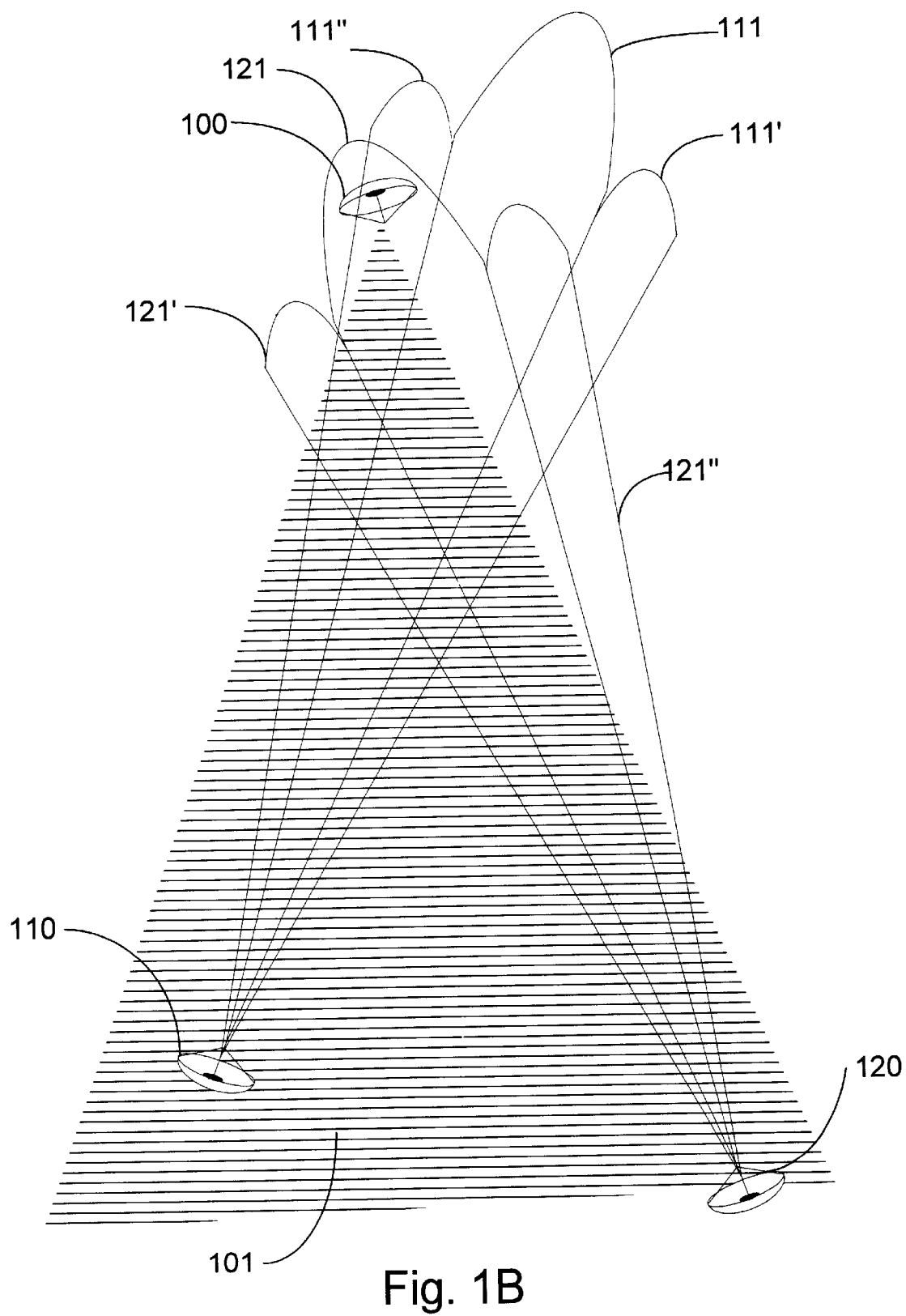
FIG. 1B is the schematic diagram illustrating point to multi points microwave antennae's aiming situation.

In FIG. 1B, antenna 100 transmits microwave radio signals toward antenna 110 and antenna 120. In an ideal situation, the microwave transmission between antenna 100 and antenna 110 or between antenna 100 and antenna 120 are not blocked or interfered by any objects between antenna 100 and antenna 110 or antenna 100 and antenna 120. Antenna 100 is within the main lobe 121 of antenna 120. This will guarantee the best link quality between antenna 100 and antenna 120 in this ideal scenario. However, antenna 100 is not in the main lobe 111 of antenna 110, but in the secondary lobe 111" of antenna 110. Because the signal strength of the secondary is a lot less than the main lobe, the link status between the antenna 100 and antenna 110 is not in best status.

In this ideal situation, there are no objects between antenna 100 and antenna 110. In other words, there is no object, which will reflect or deflect the microwave radio signals. Therefore, the perfect setting should be that antenna 100 is covered by the main lobe of antenna 110. In order to obtain the best link quality, antenna 110 must be adjusted to the position to ensure the antenna 100 to be at the center of the main lobe 111 of antenna 110. Antenna 100 should not be within the secondary lobe 111' or secondary lobe 111".

Figure 2:
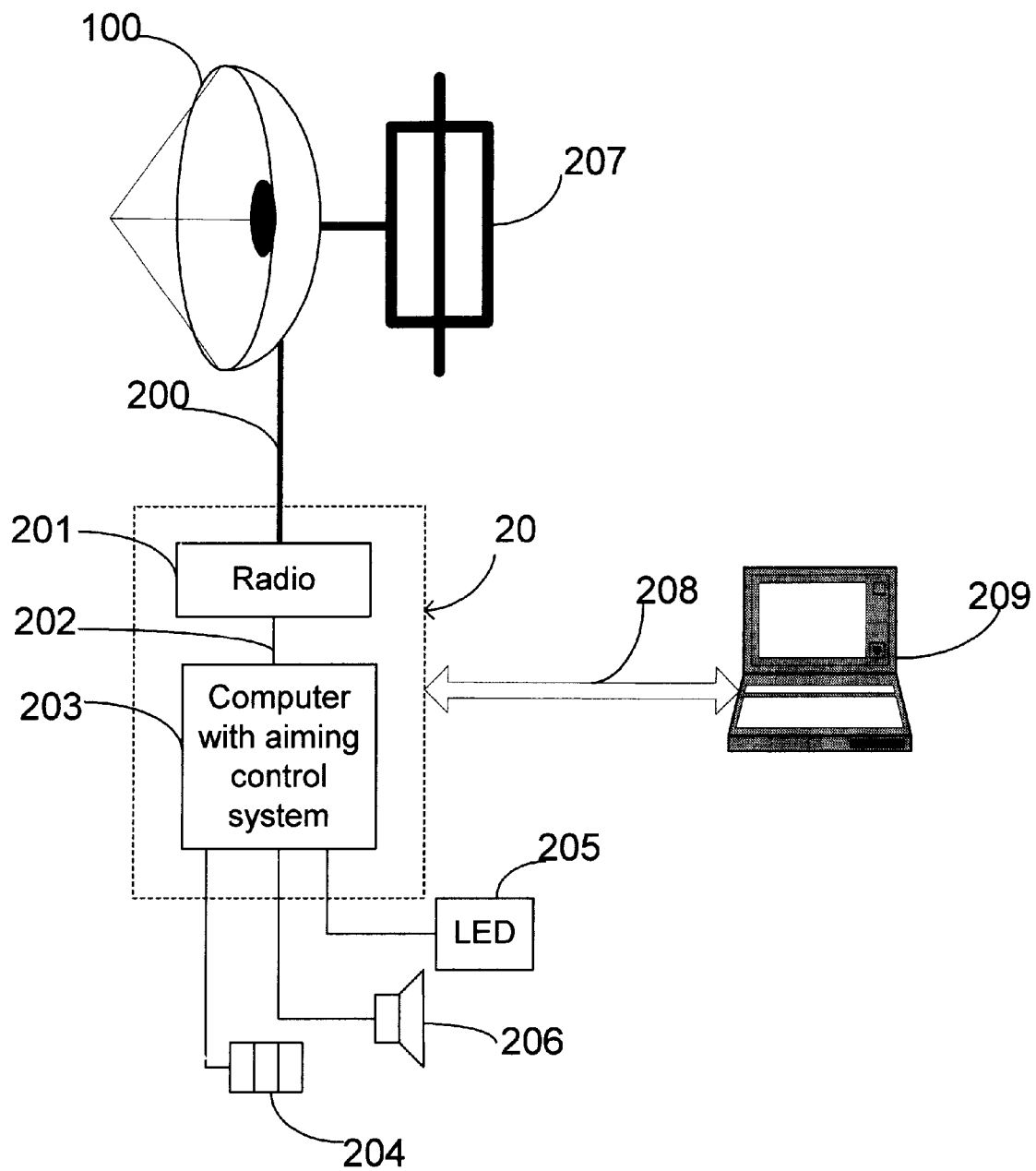
FIG. 2 is the function block diagram of one microwave radio communication system with the present invention.

FIG. 2 is the function block diagram of one microwave radio communication system with the present invention. The radio unit 201 (a complete radio which is capable to transmit and receive with the same type of radio; in another word the radio unit is capable to communicate with the same type of radio) and aiming computer 203 can be separate devices linked by a cable 202 or other connection. The radio and aiming computer can also be combined in one unit 20 as illustrated in FIG. 2. Typically, the aiming computer is a software feature portion of the computer of the radio system itself. The radio and aiming computer unit 20 is linked to the antenna 100 through a cable 200. The antenna 100 is mounted to an antenna mounting structure 207. The radio and computer unit 20 can have its own display integrated into the unit or can also have a monitoring display 209 and a distance away from the transceiver and computer unit connection through link connection 208. The radio and computer unit 20 also has software built into the computer system. The software is capable of measuring the parameters that assist the antenna aiming to the other antenna with the best link quality. The radio and computer system also has some control buttons, which allow the installer to start and finish the aiming process and also allow the installer to fine tune the installation process. The computer system also has an LED display 205 to display some data to assist the installer in obtaining the best link quality. A speaker 206 is also connected to the computer system by which the aiming system can also guide the installer to obtain the best link quality by audio.

Figure 3:
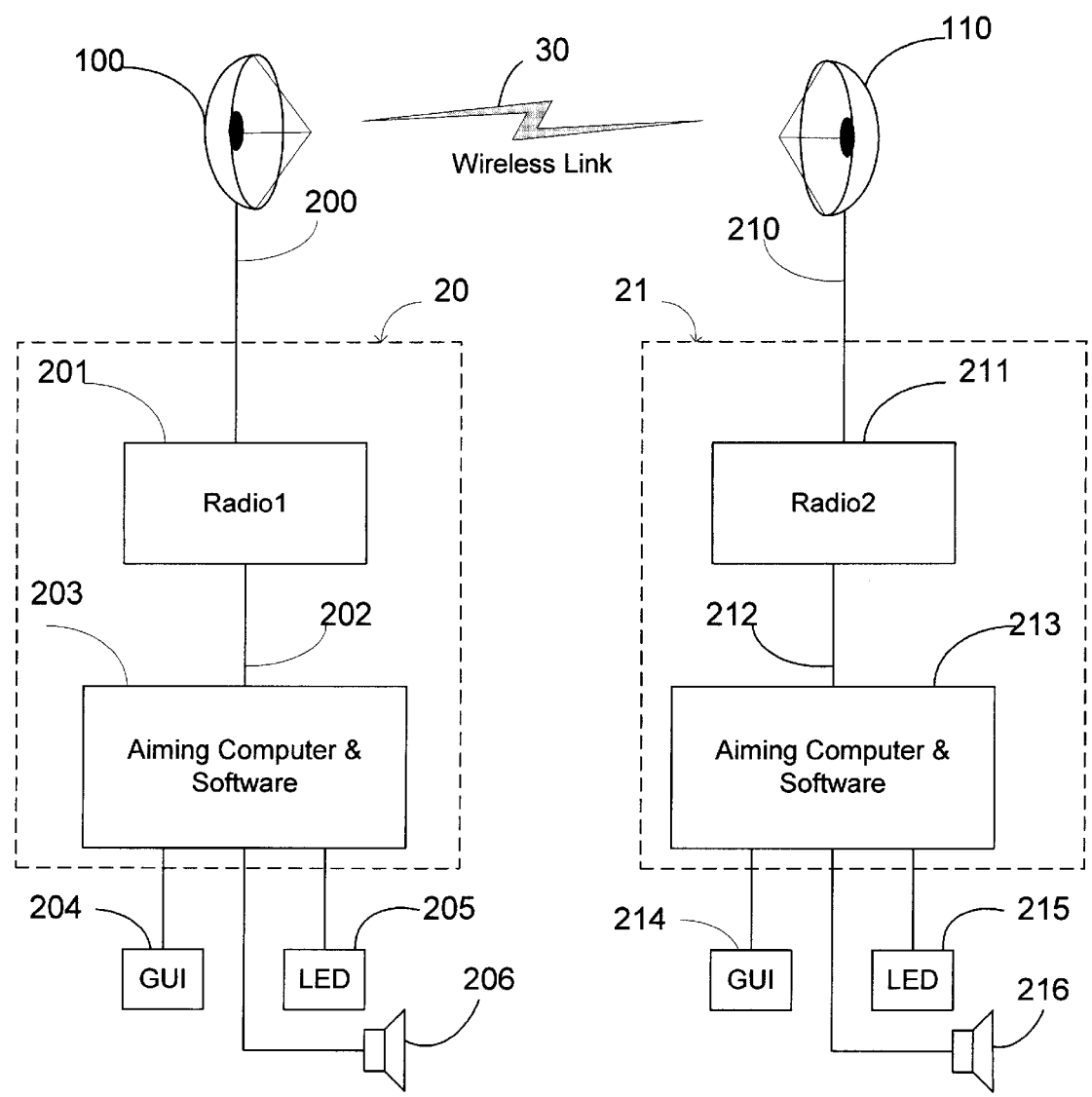
FIG. 3 is the function block diagram of wireless communication link formed by two microwave radio communication systems with the present invention.

FIG. 3 is the function block diagram of wireless communication link formed by two microwave radio communication systems with the present invention. A directional antenna 100 is connected to radio and computer system 20 through the connection 200 to radio 201. The aiming computer 203 comprises computer software and graphics user interface GUI 204, LED display 205 and a speaker 206. The radio system 20 and 21 are communication to each other through antennas 100 and 110.

During the installation, both systems coordinate to each other at special communication mode. For example, when installing antenna 110 (The second antenna) and radio system 21 to communicate with the antenna 100 (The first antenna) and radio system 20, the antenna 100 (The first antenna) and radio system 20 is already set up and running the process that can coordinate with the second antenna and radio system 21 to do the link quality test during the installation. When the aiming software of the aiming computer 213 started and the second antenna is turned toward the first antenna 100. The link quality test wireless link 30 is established. The goal of the aiming process of the present invention is to ensure the link quality of the test wireless link 30 works at the optimum status. Because the link quality test will test the performance of the wireless link at networking layer one, two, and three, the system working at best test link quality means the system will work at best status of the normal communication situation. Only one end, the end that has complete the aiming of process of the present invention, is considered as working at the best aiming status. For point-to-point deployment, the aiming process should be completed at both ends one by one to achieve the best link status. For point to multi points deployment, in order to achieve the optimum performance of the whole system, the aiming process of ends of center nod must coordinate with one of the client nod locates in the center of the coverage of the center nod. The rest client nods if complete the aiming processes of the present invention are considered working at best link status.

Figure 4:
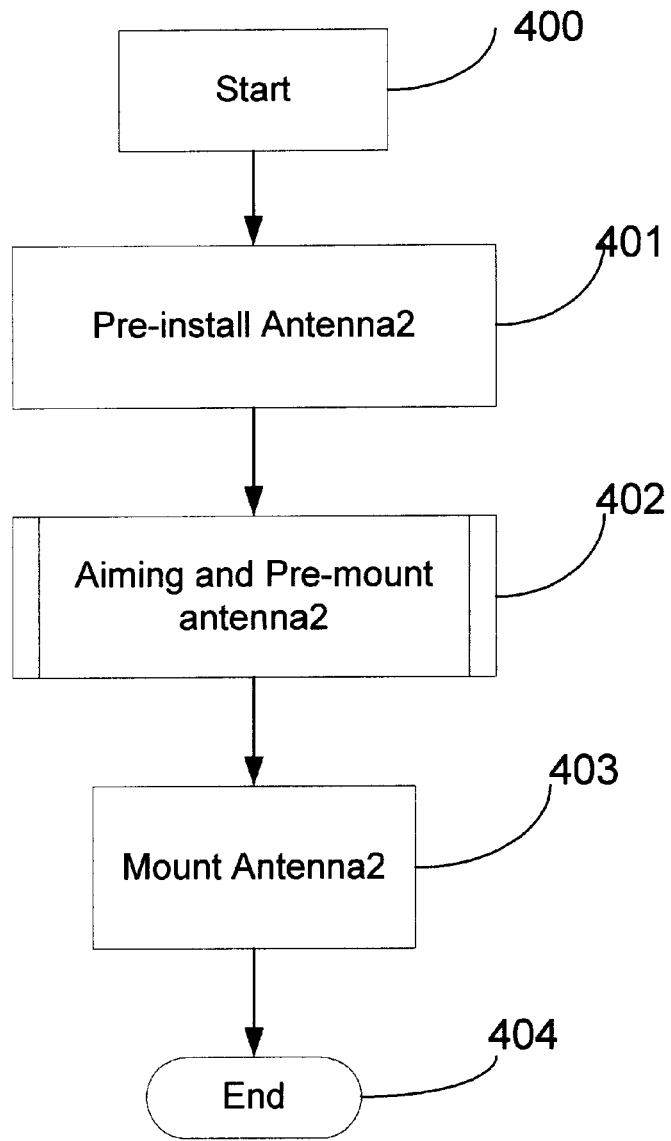
FIG. 4 is the flow chart of the second antenna installing process with the present invention.
Figure 5:
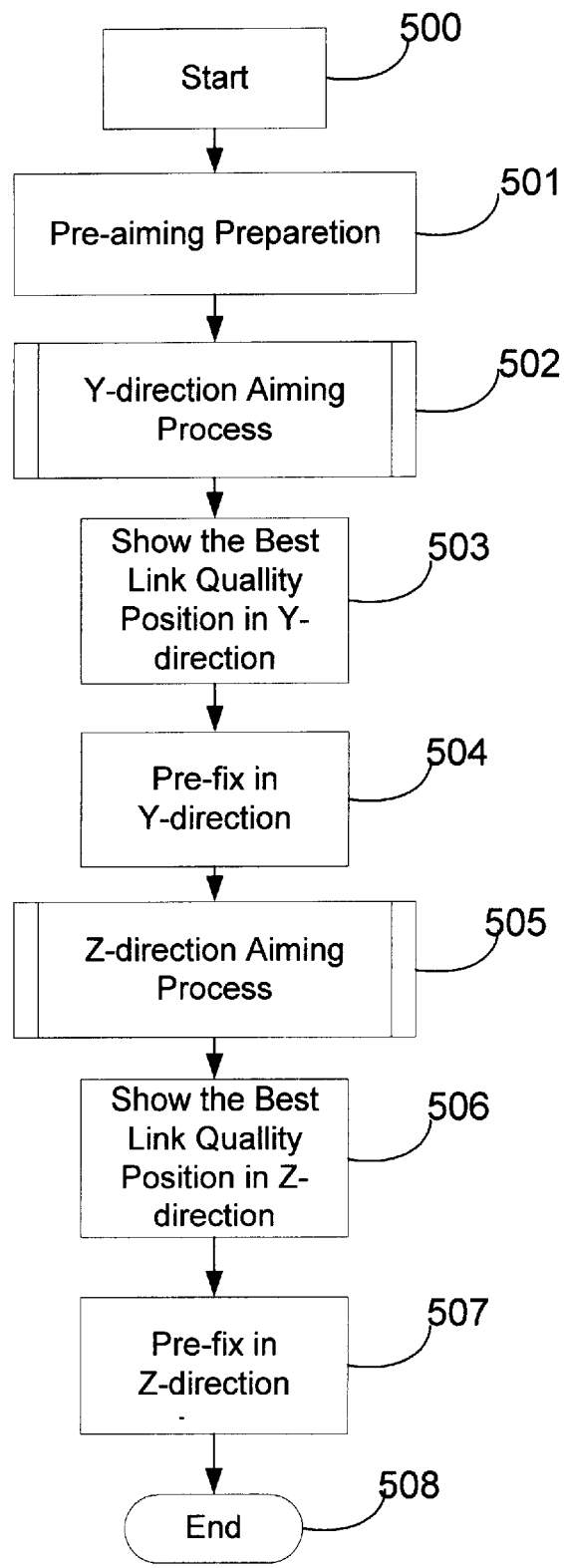
FIG. 5 is the flow chart of antenna aiming process with the present invention.

FIG. 4 is an installation process flowchart to install the second antenna in order to obtain the best link quality with the first antenna, which is already being installed. The installation process starts at 400. The installers preinstall the antenna2 (at the step 401) without permanently mounting the antenna on its mounting structure. Once antenna2 is installed on its mounting structure, it is ready to start the aiming process at the step402. The aiming process 402 is illustrated in FIG. 5, which will be discussed later. After the aiming process 402 is finished, antenna2 should aim to antenna 1 with the best link quality it can get under such a situation, the next step 403 is to permanently mount antenna2 into its place with the best link quality to the corresponding antennae. After antenna2 is permanently mounted on its mounting structure, the process ends at 404.

Figure 6:
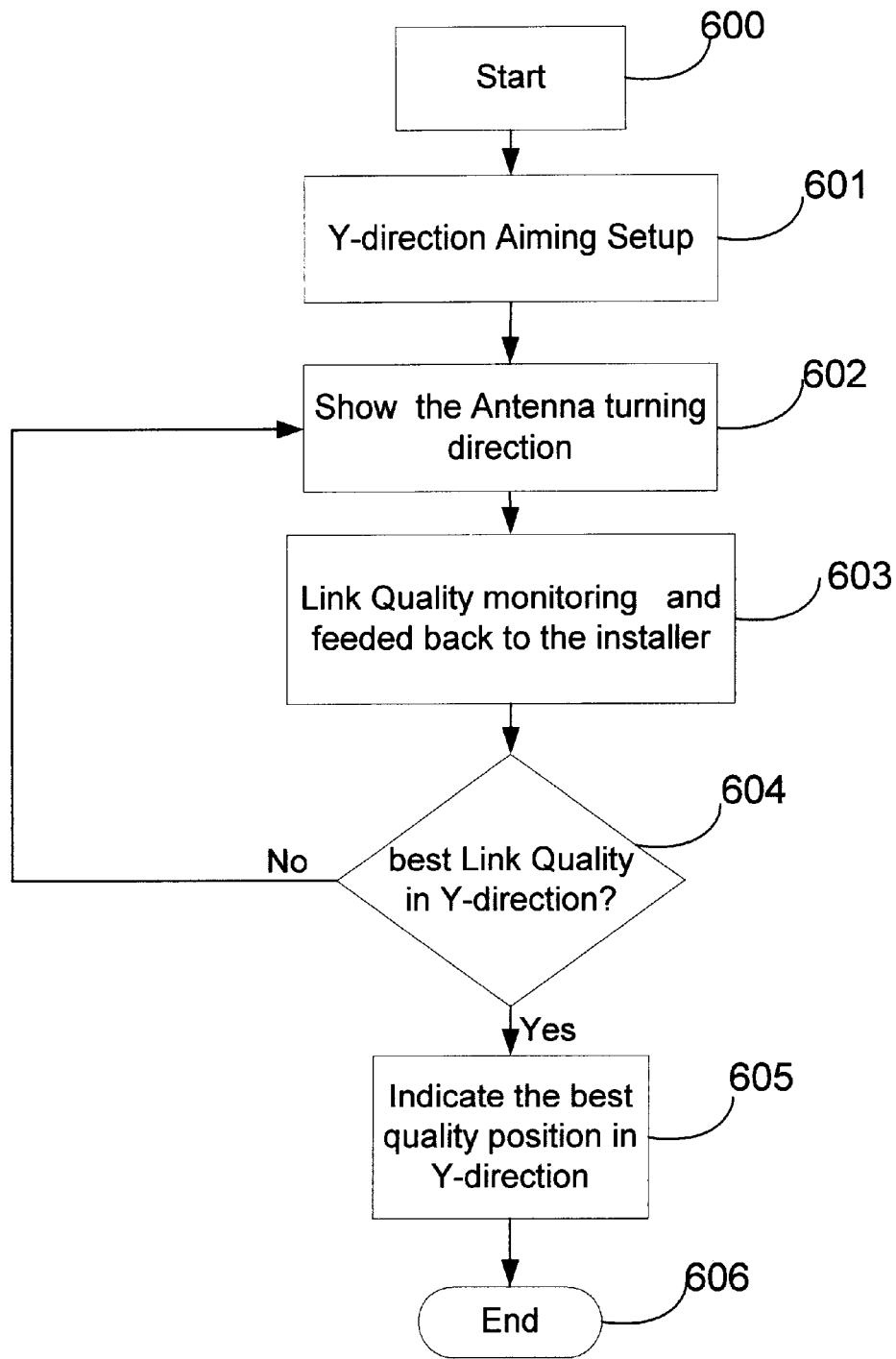
FIG. 6 is the flow chart of antenna Y-direction (horizontal polarization) aiming process with the invention.

FIG. 5 illustrates the aiming of the pre-mounted antenna to the corresponding antenna in order to obtain the best link quality. At step 500, the antenna has been pre-mounted on its mounting structure. The aiming process begins at step 501. The antenna is adjustable in two directions, the y direction, which is the horizontal direction, and z direction, which is the vertical direction. The first adjustment is the horizontal direction adjustment 502. The details of the horizontal adjustment process 502 are illustrated in FIG. 6, which will be discussed later. After the horizontal adjustment process 502, the horizontal position should be adjusted in the best link quality position as illustrated in step 503. The antenna should be permanently fixed in the horizontal direction. In step 504, the horizontal movement of the antenna is fixed. Therefore, the antenna can only move in the vertical direction. The aiming process goes in the vertical direction 505. The vertical aiming process will be illustrated in detail in FIG. 7 later. As it is in step 505, the vertical adjustment process 506 gives the antenna the best link quality at vertical position. The antenna's vertical position is permanently fixed at step 507 to obtain the best quality in both vertical and horizontal positions. Therefore, the process ends at step 508.

Referring to FIG. 6, the antenna horizontal aiming process starts at step 600. The installer can adjust the antenna in the horizontal direction without moving the antenna in the vertical direction. At this step 601, the installer hooks up all his aiming devices, including radio, computers and other communication devices as mentioned earlier. The installer starts moving the antenna in the horizontal direction at step 602. This movement should be very carefully managed with constant movement by turning the antenna in a circular direction. The aiming software will guide the direction for the installer to turn the antenna. The aiming computer and software is also capable of recording the link quality. The link quality includes the following parameters: signal strength, Layer one BER, retransmission, Latency and any other factor will be needed for testing the particular radio. Once the installer is able to turn the antenna in a complete circle, or once the computer reaches very poor link quality, or the adjusting antenna receives no signal, the software will guide the installer to turn the antenna in the opposite direction and monitoring the link quality while the installer turns the antenna in such opposite direction. The recorded link quality by the computer will provide the installer such data that the installer can determine in a general direction that the link quality record indicates the best link quality of the antenna communications.

The installer will turn the antenna in the horizontal direction at a much slower speed to find the best link quality in this general direction. The installer will repeat steps 602, 603, 604 several times if the installer is not satisfied with its link quality records in the computer until the computer finds the link quality is at the best status of the current procedure 605. The installer will fix this direction as the best aiming direction in the horizontal position. The process ends at step 606.

Figure 7:
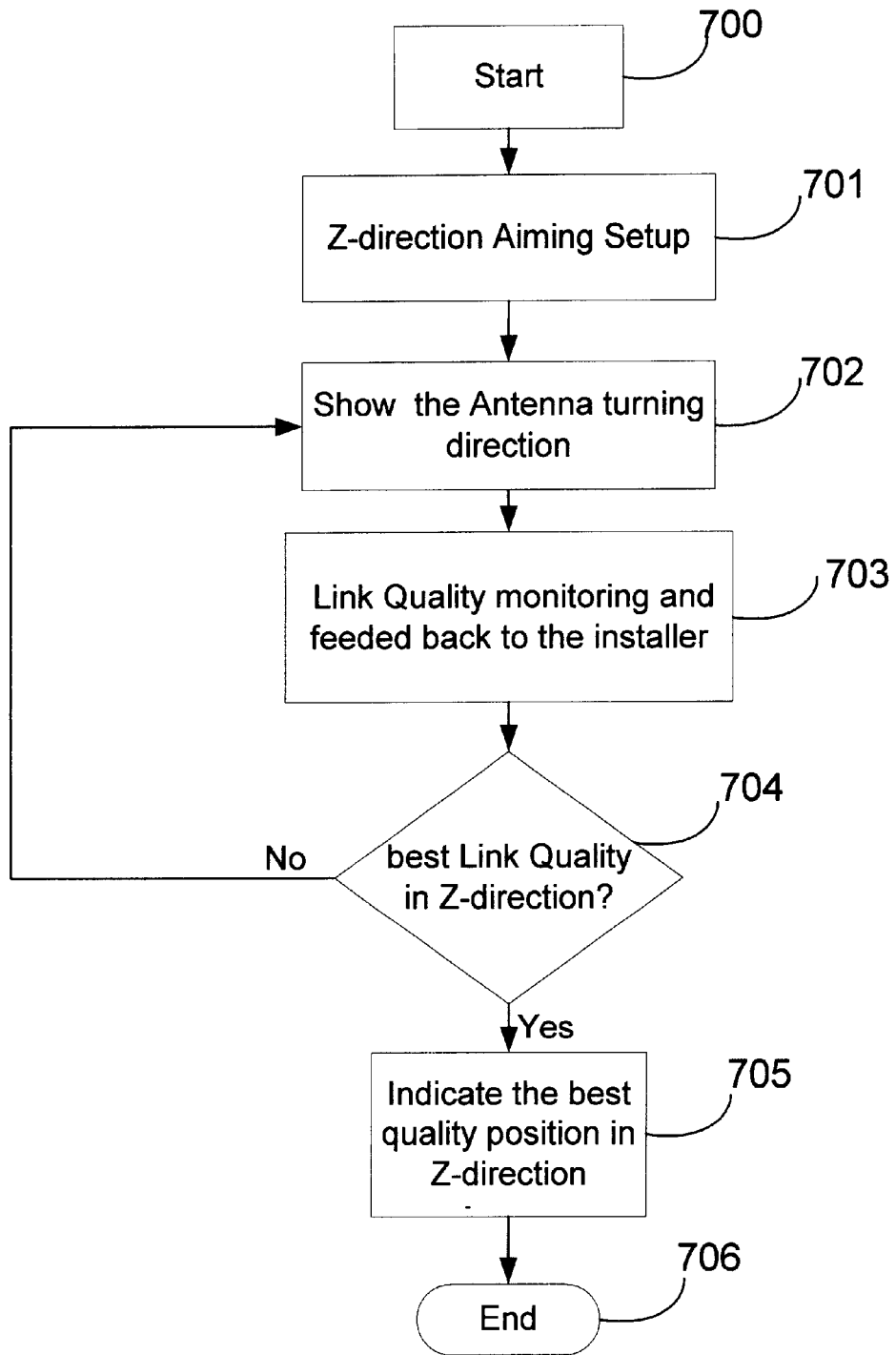
FIG. 7 is the flow chart of antenna Z-direction (vertical polarization) aiming process with the invention.

Once the horizontal direction of the antenna aiming process is finished, the installer will continue the aiming process by turning the antenna in the vertical direction as illustrated in FIG. 7, starting from step 700. The vertical direction aiming process is similar to the horizontal direction aiming process. The installer starts aiming in the vertical direction at step 701 by the same computer link as it did in the horizontal aiming process. In the next step 702, the installer will move the antenna usually from the lower aiming position, gradually turning the antenna to the upper direction. The computer software will test and provide link quality parameters to the display of the computer. At the same time, the computer will record these parameters. This is performed at step 703. The installer will move the antenna in a vertical direction up and down several times to record the link quality and its corresponding positions. The installer will move the antenna in the vertical direction until the detected link quality goes very poor or no link can be established. As illustrated in step 704, the installer will repeat such steps from 702 to 704 several times until the link quality parameters are the best in current aiming procedure. Once the link quality is at the best, the computer will prompt the installer to fix the antenna in its vertical direction permanently to end the vertical direction aiming process.

Conclusion, Ramifications, and Scope

Thus the reader will see that I have provided a method for aiming and adjusting microwave antenna during installation, which is fully computer guided with in-system link quality test result. The computer guides the installer to adjust the microwave antenna correctly during the installation. No other equipments are needed. It is very easy to achieve the best aiming direction by following the aiming method.

Furthermore, the antenna aiming method by fully computer guided with in-system link quality test result has additional advantages in that:

The aiming direction is based on achieving the best link quality instead of the strongest signal. In-system test means actually tests the data communication in between two antennas and the radio communication systems behind them.

Computerized link quality monitoring can automatically monitor, record the link quality during the installation of substantially and consistently tuning the antenna. This is un-reachable by any method of the prior arts.

Fully computerized instructing will eliminate human error by using other equipment to aim the antenna.

Because the computer reads the actual in-system test result, it is much more accuracy than alternate method of aiming the antenna. For example: when aiming an antenna by using spectrum analyzer, the spectrum analyzer can only pick up the gain detected. No network performance can be tested.

The method of current invention provides low cost because of no high skilled manpower is needed to install a microwave antenna.

The method of current invention provides low cost because of no expensive equipment is needed to install a microwave antenna.

The maintains are easy by adjusting the antenna instead of prior art requiring a dissete the original installation.

Less steps are needed during the installation in compare with using spectrum analyzer or other assistant equipments, therefore less cost and less potential errors in compare with prior arts.

Much more flexibility during the installation because of the radio system has the in-system link quality monitor means. In another words, the computerized aiming feature come along with radio system makes the installation much easier to be carried out at many difficult locations.

Although the description above contains much specificity, these should not be construed as limiting the scope of the invention but as merely providing illustrations of some of the presently preferred embodiments of this invention. Various other embodiments and ramifications are possible within it's scope. For example:

An eyeball pre-aiming process may be added. Therefore, the spirit and scope of the appended claims should not be limited to the description of the preferred versions described herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose. Thus, unless expressly stated otherwise, each feature disclosed is one example only of a generic series of equivalent or similar features.

The method of current invention may be used to other type of communication system. Such as: infer-red laser communications.

Thus the scope of the invention should be determined by the appended claims and their legal equivalents, rather than by the examples given.

What is claimed is:

1. A method of achieving best wireless link status of microwave communication system by aiming the antennas at the best direction comprising the steps of:

a) installing a first microwave antenna and the radio system behinds;

b) setting the first antenna and radio system in working status, which is capable to communicate with the second antenna and radio system behind;

c) placing a second microwave antenna in a distance from the first microwave antenna; make any setup, which is necessary for the two radio systems behind the antennas are able to communicate to each other;

d) turning the second microwave antenna in a substantially circular horizontal direction and using a computerized monitoring system to monitor and record link qualities and corresponding horizontal positions of the link qualities continuously while the second antenna is turning until the second microwave antenna makes a complete circle;

e) affixing the second microwave antenna horizontally in a best horizontal position wherein such best horizontal position has a best link quality;

f) turning the second microwave antenna in two substantially vertical opposing directions and using the computerized monitoring system to monitor and record vertical link qualities and corresponding vertical positions of the vertical link qualities continuously while the second antenna is turning vertically;

g) affixing the second microwave antenna vertically in a best vertical position wherein such best vertical position has a best link quality; and wherein the second microwave antenna is placed in the best link quality position in relationship to the first microwave antenna.

2. The method of claim 1, wherein the first microwave antenna is capable of both emitting and receiving microwave signals.

3. The method of claim 1, wherein the second microwave antenna is capable of both emitting and receiving microwave signals.

4. The method of claim 1, wherein the distance between the first microwave antenna and the second microwave antenna is limited to capabilities of the microwave antennas and the radio systems behind receiving workable microwave signals from each other.

5. The method of claim 1, wherein the link quality is a tests result of the communicating status between two radio systems via the antennas.

6. The method of claim 5, wherein the tests result comprises physical layer, communication test results.

7. The physical layer test result of claim 6 comprises the radio frequency (RF) signal strength and noise detected by a radio receiver.

8. The communication test of claim 6 is a data communication tests result.

9. The method of claim 1, wherein the computerized monitoring system is capable of monitoring link quality, recording the link qualities and their corresponding positions, displaying and audio indicating information, indicating the direction to turn and the best aiming direction to reach.

* * * * *